(12) United States Patent
Hong

(10) Patent No.: US 11,339,064 B2
(45) Date of Patent: May 24, 2022

(54) METHOD FOR TREATING TAILINGS

(71) Applicant: Kun-Liang Hong, Tainan (TW)

(72) Inventor: Kun-Liang Hong, Tainan (TW)

( * ) Notice: Subject to any disclaimer, the term of this patent is extended or adjusted under 35 U.S.C. 154(b) by 133 days.

(21) Appl. No.: 16/575,671

(22) Filed: Sep. 19, 2019

(65) Prior Publication Data

US 2020/0115259 A1 Apr. 16, 2020

(30) Foreign Application Priority Data

Oct. 12, 2018 (CN) .......................... 201811189181.1

(51) Int. Cl.
| | |
|---|---|
| *C02F 1/46* | (2006.01) |
| *C02F 1/467* | (2006.01) |
| *C02F 1/461* | (2006.01) |
| *C02F 103/10* | (2006.01) |
| *C02F 101/20* | (2006.01) |

(52) U.S. Cl.
CPC ........ *C02F 1/4674* (2013.01); *C02F 1/46109* (2013.01); *C02F 2001/46142* (2013.01); *C02F 2101/20* (2013.01); *C02F 2103/10* (2013.01); *C02F 2303/04* (2013.01)

(58) Field of Classification Search
CPC ..................................... C02F 1/46; C02F 1/32
See application file for complete search history.

(56) References Cited

FOREIGN PATENT DOCUMENTS

CN 102312083 A * 1/2012

* cited by examiner

*Primary Examiner* — Walter D. Griffin
*Assistant Examiner* — Cameron J Allen
(74) *Attorney, Agent, or Firm* — Rosenberg, Klein & Lee

(57) ABSTRACT

A method for treating tailings includes the step of S1: mixing the tailings to be treated with a neutral active aqueous solution and then drying the tailings, wherein the neutral active aqueous solution is prepared from water via an electrocatalytic water device, and the circulation time of the water in the electrocatalytic water device is 5-60 min, and the mass ratio of the tailings to the neutral active aqueous solution is 1:1-10:1.

18 Claims, 10 Drawing Sheets

METHOD FOR TREATING TAILINGS

BACKGROUND OF THE INVENTION

1. Field of the Invention

The present invention relates to mineral processing technology and more particularly, to a method for treating tailings.

2. Description of the Related Art

China is a country rich in minerals. It has a high demand for non-ferrous metals and rare metals every year. However, after the sorting operation in the ore dressing, there will be a portion of the useful target components remaining in the beneficiation that cannot be used for production. This part is called tailings.

At present, the tailings that are difficult to treat mainly include converter stone, red mud, phosphogypsum and molybdenum. Specifically, there are strong alkali and heavy metal pollution in converter stone and red mud, strong acid and heavy metal pollution in phosphogypsum, and heavy metal pollution in molybdenum ore.

If the tailings are not treated and directly discharged into the soil and water, they will cause heavy metal pollution, acidification and alkalization pollution.

SUMMARY OF THE INVENTION

The present invention has been accomplished under the circumstances in view. It is therefore the main object of the present invention to provide a method for treating tailings, which overcomes the defects of environmental pollution caused by direct discharge of tailings containing strong acid or strong alkali and heavy metal ion. The method for treating tailings is simple and convenient, can quickly treat the heavy metal ions and strong acid or alkali in the tailings to the extent of reaching the standard discharge. Further, the method for treating tailings has obvious treatment effect and the economic benefit is very significant.

The present invention solves the above technical problems by the following technical solutions:

The invention provides a tailing treatment method, which comprises the following step S1: The tailings are uniformly mixed with a neutral active aqueous solution, and then dried. The neutral active aqueous solution is prepared from water by an electrocatalytic water device, and the circulation time of the water in the electrocatalytic water device is 5-60 min. The mass ratio of the tailings to the neutral active aqueous solution is 1:1-10:1.

The above treatment method can quickly treat the heavy metal ions in the tailings to the extent of reaching the standard discharge, the treatment effect is obvious, and the economic benefit is very remarkable.

In the above treatment method, the tailings are preferably molybdenum ore. Since the molybdenum ore does not contain strong acid or alkali, the above treatment method can quickly and directly treat the heavy metal ions in the molybdenum ore to the extent of reaching the standard discharge, and the treatment effect is obvious, and the economic benefit is very significant.

Preferably, in the above treatment method, the circulation time of the water in the electrocatalytic water device is 5-40 min, more preferably 10-20 min.

Preferably, in the above treatment method, the mass ratio of the tailings to the neutral active aqueous solution is 3:1-5:1.

In the above treatment method, the number of cycles of uniformly mixing and drying the tailings with the neutral active aqueous solution depends on the content of heavy metals in the tailings, for example, may be 2 or more or 2-10 times or 6-30 times, but as long as 7 times.

Here we need to explain the number of cycles. When the number of cycles of uniformly mixing and drying the tailings with the neutral active aqueous solution is 2 times, the meaning referred to is: Mixing the tailings with the neutral active aqueous solution and then drying the tailings to obtain tailings I, and then mixing the tailings I with the neutral active aqueous solution and then drying the tailings I to obtain tailings II. The end of the above process means that the number of cycles of uniformly mixing and drying the tailings with the neutral active aqueous solution is 2 times.

In the above treatment method, before the tailings are uniformly mixed with the neutral active aqueous solution, when the tailings is a converter stone or a red mud, Step S0 is preferably performed: Mixing the tailings with the active aqueous solution A uniformly, reacting under sealed conditions for 0.2-5 hours, and after solid-liquid separation, performing Step S1, wherein, the active aqueous solution A has a pH of 1-2, which is prepared from an aqueous solution of hydrochloric acid via an electrocatalytic water device; the mass ratio of the tailings to the active aqueous solution A is 1:(0.5-10).

In Step S0, the converter stone has the conventional meaning in the art, and its component analysis data, bulk specific gravity and pH value are shown in the following table:

TABLE 1

Component analysis of converter stone

| | Item | Result |
|---|---|---|
| component analysis (wt %) | $SiO_2$ | 11.45 |
| | $Al_2O_3$ | 4.48 |
| | $Fe_2O_3$ | 21.60 |
| | CaO | 39.37 |
| | MgO | 6.39 |
| | $TiO_2$ | 0.49 |
| | $P_2O_5$ | 1.97 |
| | MnO | 4.01 |
| | LOI (Oxygen Index) | 3.94 |
| | total | 93.70 |
| bulk specific gravity | | 3.2 |
| pH | | 12 |

In Step S0, the mass ratio of the converter stone to the active aqueous solution A is 1:(2-5).

The active aqueous solution A is further described below:

In Step S0, the pH of the active aqueous solution A is preferably 1.5.

In Step S0, the concentration of the aqueous hydrochloric acid solution is preferably from 0.1 wt %-5 wt %, more preferably 0.3 wt %.

In Step S0, the pH of the aqueous hydrochloric acid solution is preferably 4-7.

In Step S0, the circulation time of the aqueous hydrochloric acid solution in the electrocatalytic water device is preferably from 3 to 30 min, more preferably 20 min.

In Step S0, in the preparation of the active aqueous solution A, the following electrochemical reaction occurs in the electrocatalytic water device: $2HCl+H_2O\rightarrow 4H^+ +Cl^- +ClO^- +2e$. The principle is: Under the electrocatalytic water device, the above electrochemical reaction occurs, and a large amount of H+ is produced to greatly reduce the pH value of the solution.

In Step S0, when the converter stone is treated with the active aqueous solution A, the reaction between the converter stone and the active aqueous solution A includes CaO reaction to form CaCl2 and Ca(ClO)2, and MgO reaction to form MgCl2 and Mg. (ClO) 2, K2O reaction to form KCl and KclO.

The specific reaction equations are exemplified as follows $$CaO+H_2O=Ca(OH)_2;$$

$$Ca(OH)_2+2HCl=CaCl_2+H_2O;$$

$$Ca(OH)_2+2HClO=Ca(ClO)_2+2H_2O;$$

$$Ca(ClO)_2+2HCl=CaCl_2+2HClO;$$

$$Ca^{2+}+2ClO^-+H_2O+CO_2=CaCO_3\downarrow+2HClO \text{ or}$$
$$ClO^-+H^+=HClO;$$

$$CaO+2HCl=CaCl_2+H_2O. \qquad \text{[Reaction equation 1]}$$

In Step S0, the sealing can be realized by a conventionally provided container having a lid, the purpose of which is to reduce the probability that the $H^+$, $OH^-$, $Cl^-$, and $ClO^-$ plasma in the solution do not participate in the acid hydrazine neutralization reaction and then volatilize into the air.

In Step S0, the pH of the solid phase obtained by the solid-liquid separation is preferably 6-9, more preferably 7-8, and the pH of the obtained liquid phase is preferably 5-7. Wherein, preferably, the liquid phase is allowed to stand and then discharged. The purpose of standing is to neutralize $H^+$ and $OH^-$ in the solution into water, and the hypochlorous acid concentration is lowered to the national standard and then discharged. The technical scheme can remove the heavy metal ions and the strong alkali in the liquid phase to ensure the pollution-free environment and can be directly discharged. The neutral solid phase material obtained by the solid-liquid separation in Step S1 can be directly taken out, and since it does not contain heavy metals and dioxin, it can be used as a building waste or paving roadbed.

In the above treatment method, before the tailings are uniformly mixed with the neutral active aqueous solution, when the tailings are phosphogypsum, the following Step S0' is preferably performed: Mix the tailings with an active aqueous solution C, react under sealed conditions for 0.1-5 hours, and then perform solid-liquid separation, wherein the active aqueous solution C has a pH of 12, which is prepared from an aqueous solution of sodium hydroxide via an electrocatalytic water device; the mass ratio of the tailings to the active aqueous solution C is 1: (0.5-10).

Hereinafter, the electrocatalytic water device in Step S0, Step S0' and Step S1 is further described:

The electrocatalytic water device can be, for example, an electrocatalytic water device produced by Suzhou Wangde Technology Co., Ltd., for example, "Reactor for continuously generating high redox water" disclosed in Embodiment 1 of the Chinese utility model patent CN202265444U, or the electromagnetic water treatment device disclosed in Embodiment 1 of the Chinese invention patent CN104722184A. The electrocatalytic water device is preferably an electrocatalytic water device having the following structure:

The electrocatalytic water device includes a set of N electrocatalytic units stacked in parallel from bottom to top, and the front and rear ends of the electrocatalytic units are sequentially connected by a connecting water pipe, wherein N is an integer greater than or equal to 2.

Every electrocatalytic unit comprises an electrolytic pipeline and an insulated pipeline.

The electrolytic pipeline is formed with a closed cavity, and the closed cavity is provided with a positive electrode plate and a negative electrode plate disposed opposite to each other, and the positive electrode plate and the negative electrode plate are respectively disposed opposite to the side wall of the electrolytic pipe and used for applying an electric field in the electrolytic pipe. The positive electrode plate and the negative electrode plate are respectively electrically connected to a positive electrode and a negative electrode of a power source.

The insulated pipeline is located between the positive electrode plate and the negative electrode plate. The insulated pipeline is provided with a filling layer formed of a low dielectric constant material, and a space for water circulation is formed in the filling layer. A gap communicating with the space is formed between the filling layer and the sidewall of the insulated pipeline, and a sidewall of the insulated pipeline is provided with a plurality of through holes communicating with the gap. Wherein, one end of the electrolytic pipeline in the first electrocatalytic unit is provided with a water inlet, and two water outlets are respectively disposed on two opposite side walls of the end of the electrolytic pipeline in the $N^{th}$ electrocatalytic unit, and the two water outlets are respectively located close to the positive electrode plate and the negative electrode plate.

In this embodiment, the positive electrode plate and the negative electrode plate are disposed in the electrolytic pipeline, so that after the positive electrode plate and the negative electrode plate are energized, a strong electric field is generated between the two electrode plates. The electric field causes the metal oxide catalyst attached to the positive electrode plate and the negative electrode plate to be induced into a semiconductor, and the metal oxide catalyst can act as a catalyst to promote the formation of hydrogen ions and hydroxide ions by water molecules and oxygen, thereby increasing the content of hydroxyl radicals in the electrocatalytic water to make the ability to neutralize heavy metal ion charges stronger.

In addition, the arrangement of the insulated pipelined and the filling layer of low dielectric constant material between the positive electrode plate and the negative electrode plate can prevent the positive electrode plate and the negative electrode plate from directly discharging the insulated pipeline, and the ions between the positive electrode plate and the insulated pipeline as well as the ions between the negative electrode plate and the insulated pipeline can pass through the insulated pipeline and the filling layer to reach the corresponding region. Because of the existence of low dielectric constant material, the impedance can be increased, so that the electric field formed between the positive electrode plate and the negative electrode plate is more uniform, thereby improving the uniformity of discharge in water, making electrolysis of water molecules more sufficient, reducing current saving energy, and prolonging the life of the electrode plates more than 30%.

In addition, according to the structure of the electrocatalytic water device of the present invention, when the device is operated, the two high voltage electrodes are electrically discharged, and the high voltage current passes through the low dielectric constant material, so that they discharge due to a capacitive induced electric field caused by polarization, which greatly increases the range of discharge, improves the effect of discharge.

It can greatly improve the produced electrocatalytic water in decomposing organic and toxic substances, killing bacteria and neutralizing heavy metal ions charges, etc., and increase the concentration of hydroxyl radicals in the produced electrocatalytic water.

Further, a water outlet is respectively disposed near the positive electrode plate and the negative electrode plate, and the acidic water and the alkaline water can be selected according to the actual situation, so that the application of the electrocatalytic water device is wider. Further, a water inlet is arranged in the first electrocatalytic unit, and a water outlet is arranged in the $N^{th}$ electrocatalytic unit, so that the water passes through the N electrocatalytic units, thereby making the electrolysis of the water more sufficient, improving the acidity of acidic water and the alkalinity of alkaline water and the ability of electrocatalytic water to decompose organic toxic substances and oil stains and kill bacteria.

Preferably, in the $N^{th}$ electrocatalytic unit, one end of the electrolytic pipeline is provided with another water outlet, and the other water outlet is located between the corresponding two water outlets in the same end of the electrolytic pipeline, and the distance between the positive electrode plate and the negative electrode plate is equal to the axis of the other water outlet.

In this embodiment, the $N^{th}$ electrocatalytic unit is provided with another water outlet at an intermediate position between the positive electrode plate and the negative electrode plate, so that the neutral water can be selected according to the actual situation, further expanding the application of the electrocatalytic water device.

Preferably, a first flow path and a second flow path are respectively formed between the positive electrode plate and the inner surface of the sidewall of the electrolytic pipeline opposite to the positive electrode plate and between the negative electrode plate and the inner surface of the sidewall of the electrolytic pipeline opposite to the negative electrode plate. The width of the first flow path is equal to the width of the second flow path.

In this embodiment, the width of the first flow path is equal to the width of the second flow path, so that the strong electric field generated between the positive electrode plate and the negative electrode plate is more uniform, thereby improving the electrolysis efficiency of the water molecules.

Preferably, the positive electrode plate and the negative electrode plate are respectively provided with a plurality of through holes.

In this embodiment, the through holes are arranged such that water molecules located between the positive electrode plate and the electrolytic pipeline and water molecules located between the negative electrode plate and the electrolytic pipeline can pass through the positive electrode plate and the negative electrode plate and reach the strong electric field formed between the positive electrode plate and the negative electrode plate. Thus, the catalysis of water molecules in the electrolytic pipeline is more fully, and the electrolysis effect of water molecules is further fully improved, so that there is no dead angle in the electrolysis of water molecules in the electrolytic pipeline.

Preferably, the positive electrode plate and the negative electrode plate respectively have an electrode column extending outward from the end remote from the water inlet. The two electrode columns are respectively provided with a connection hole. By means of the respective connection holes, the two electrode columns are respectively electrically connected to the positive pole and the negative pole of the power source by a respective electric wire.

In this embodiment, the positive electrode plate and the negative electrode plate are electrically connected to the positive pole and the negative pole of the power source through the respective electrode columns. Simply by soldering the respective electric wires to the connection holes of the respective electrode columns to realize the electrical connection between the positive and negative electrode plates and the positive and negative poles of the power source, the invention reduces the production cost and the electrical connection is more reliable.

Preferably, the power source is a high voltage DC power source, and the voltage of the power source is 20V-18000V; or the power source is a high voltage AC power source, and the voltage of the power source is 20V-23000V.

Preferably, the electrolytic pipeline comprises: a hollow outer casing with two open ends and two end caps, and the two end caps are respectively sealed and connected to the two ends of the casing through a sealing member to form the closed cavity.

In this embodiment, the setting of the sealing member improves the sealing of the closed cavity.

Preferably, the through holes are evenly respectively disposed on the sidewalls of the insulated pipeline, and the through holes form a mesh structure.

Preferably, the insulated pipeline is located intermediate between the positive electrode plate and the negative electrode plate, and the material of the insulated pipeline is UPVC (unplasticized polyvinyl chloride), PVC (polyvinyl chloride), PP (polypropylene), or polytetrafluoroethene (PTFE; Teflon).

In this embodiment, by adopting the above structure, it is possible to keep positive ions generated by discharge or electrolysis normally moving to the anode, and negative ions normally moving to the cathode; a large portion of positive ions can be kept close to the anode, and negative ions close to the cathode.

Preferably, the filling layer comprises a plurality of fillers arranged in sequence, the shape of the fillers is spherical, cubic or ellipsoidal, and the fillers are made of a low dielectric constant material.

In this embodiment, the arrangement of the insulated pipeline and the filling layer allows the discharge between the positive electrode plate and the negative electrode plate to pass through the low dielectric constant material to achieve uniform discharge. At the same time, instead of using a cation exchange membrane or an anion exchange membrane, a large proportion of positive ions in water can be concentrated on the anode and a large proportion of negative ions can be separated and concentrated in the vicinity of the cathode. It has the function of replacing cation exchange membrane and anion exchange membrane.

Preferably, the low dielectric constant material is one or more of glass, alumina, ceramic, corundum porcelain and rutile porcelain; the equivalent diameter of the fillers is 6 mm-7 mm.

Preferably, the outer surface of each of the fillers is coated with a catalytic layer.

In this embodiment, the fillers are used as carriers, and their surfaces are coated with a catalytic layer. The catalytic layer forms a wet oxidation catalyst in water, and the wet oxidation catalyst is located in the high voltage electric field formed by the positive and negative electrodes and absorbs electric field energy to form a wet electric catalyst. It has the ability to increase oxidation and destroy exhaust gas, making the exhaust gas that was originally difficult to be decomposed and destroyed easy to handle.

Preferably, the catalytic layer is made of a heterogeneous precious metal catalytic series material. The heterogeneous precious metal catalytic series material is one or more of metal oxides of Ru, Rh, Pt, Ir and Pd. Alternatively, the material of the catalytic layer is a transition metal oxide catalytic series material, and the transition metal oxide catalytic series material is one or more of metal oxides of Cu, Mn, Fe and Zn.

Based on the common knowledge in the field, the above various preferred conditions can be arbitrarily combined, that is, various preferred embodiments of the present invention are obtained.

The reagents and raw materials used in the present invention are commercially available.

The positive effects of the present invention are: The treatment method of the invention is simple and convenient and can quickly treat the heavy metal ions and strong acid or strong alkali in the tailings to the extent of reaching the standard discharge. The treatment effect is obvious. The economic benefit is very significant. The cost of treating one ton of tailings is about 50-100 Chinese Yuan Renminbi.

DETAILED DESCRIPTION OF THE PREFERRED EMBODIMENT

Figure 1:
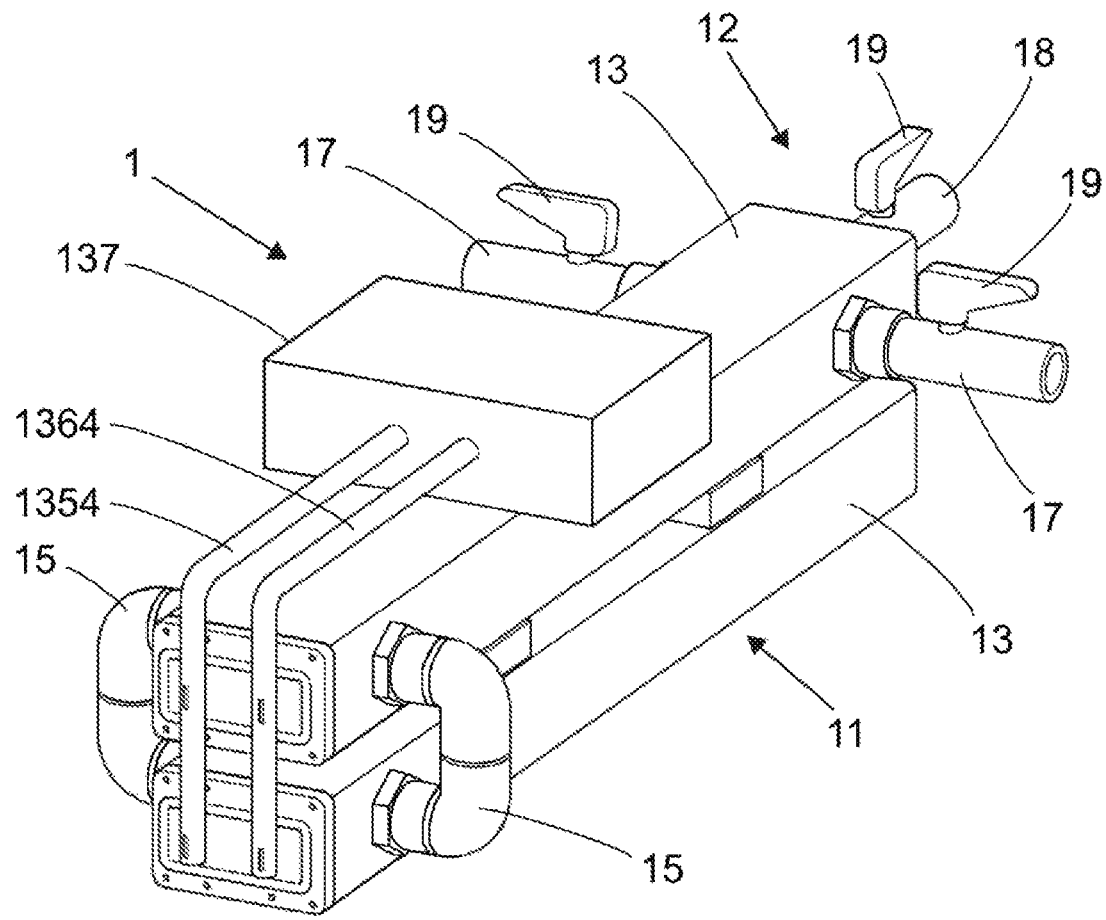
FIG. 1 is a schematic perspective view of an electrocatalytic water device in accordance with a first embodiment of the present invention.

The present invention is described by the following embodiment, which is not intended to limit the scope of the invention. The experimental methods in the following preferred embodiment which do not specify the specific conditions are selected according to the conventional methods and conditions, or according to the product specifications.

In the description of the present invention, it is to be understood that the terms "upper", "lower", "front", "back", "left", "right", "vertical", "level", "top", "bottom", "inside", "outside" and the like are based on the orientation or positional relationship shown in the drawings and merely for the convenience of describing the present invention and simplifying the description. These terms are not intended to indicate or imply that a device or component that has a particular orientation or is constructed and operated in a particular orientation, and therefore these terms are not to be construed as limiting the invention.

In the following embodiment, the component analysis data, bulk specific gravity and pH value of the converter stone used are as shown in Table 2:

TABLE 2

| Component analysis of converter stone | | |
|---|---|---|
| | Item | Result |
| component analysis (wt %) | $SiO_2$ | 11.45 |
| | $Al_2O_3$ | 4.48 |
| | $Fe_2O_3$ | 21.60 |
| | CaO | 39.37 |
| | MgO | 6.39 |
| | $TiO_2$ | 0.49 |
| | $P_2O_5$ | 1.97 |
| | MnO | 4.01 |
| | LOI (Oxygen Index) | 3.94 |
| | Total | 93.70 |
| bulk specific gravity | | 3.2 |
| pH | | 12 |

Example 1

The converter stone treatment method used in embodiment 1 comprises the following Step S0: Mix the converter stone with an active aqueous solution A, react under sealed conditions for 2 hours, and separate the solid and liquid, wherein the active aqueous solution A has a pH of 1.5, which is prepared from an aqueous hydrochloric acid solution via an electrocatalytic water device; the mass ratio of the converter stone to the active aqueous solution A is 1:5. In Step S0, during the preparation of the active aqueous solution A, the aqueous hydrochloric acid solution is prepared by diluting the hydrochloric acid solution, and the concentration of the aqueous hydrochloric acid solution is 0.3 wt %; the aqueous hydrochloric acid solution has a pH of 6.5; the circulation time of the aqueous hydrochloric acid solution in the electrocatalytic water device is 20 min.

In Step S0, in the preparation of the active aqueous solution A, the following electrochemical reaction occurs in the electrocatalytic water device: $2HCl+H2O \rightarrow 4H+Cl^-+ClO^-+2e$.

In Step S0, when the converter stone is treated with the active aqueous solution A, the reaction between the converter stone and the active aqueous solution A includes CaO reaction to form $CaCl_2$ and $Ca(ClO)_2$, MgO reaction to form $MgCl_2$ and $Mg(ClO)_2$, and $K_2O$ reaction to form KCl and KclO. The specific reaction equations are exemplified as follows $CaO+H_2O=Ca(OH)_2;$ $Ca(OH)_2+2HCl=CaCl_2+H_2O;$ $Ca(OH)_2+2HClO=Ca(ClO)_2+2H_2O;$ $Ca(ClO)_2+2HCl=CaCl_2+2HClO;$ $$Ca^{2+}+2ClO^-+H_2O+CO_2=CaCO_3\downarrow+2HClO \text{ or}$$
$$ClO^-+H^+=HClO;$$

$$CaO+2HCl=CaCl_2+H_2O. \quad \text{[Reaction equation 2]}$$

In Step S0, the solid phase obtained by solid-liquid separation has a pH of 7-8, and the pH of the obtained liquid phase is 5-7. The liquid phase is allowed to stand and then discharged. The purpose of standing is to neutralize $H^+$ and $OH^-$ in the solution into water, and the hypochlorous acid concentration is reduced to the national standard and then discharged.

The solid phase obtained by solid-liquid separation in Step S0 continues the reaction of the following Step S1:

Mix the solid phase obtained by solid-liquid separation in Step S0 with a neutral active aqueous solution and then dry the solid phase, then, repeat the above process 7 times, wherein the neutral active aqueous solution is prepared by water via an electrocatalytic water device, and the circulation time of water in the electrocatalytic water device is 10 min; the mass ratio of the converter stone to the neutral active aqueous solution is 2:1.

Figure 2:
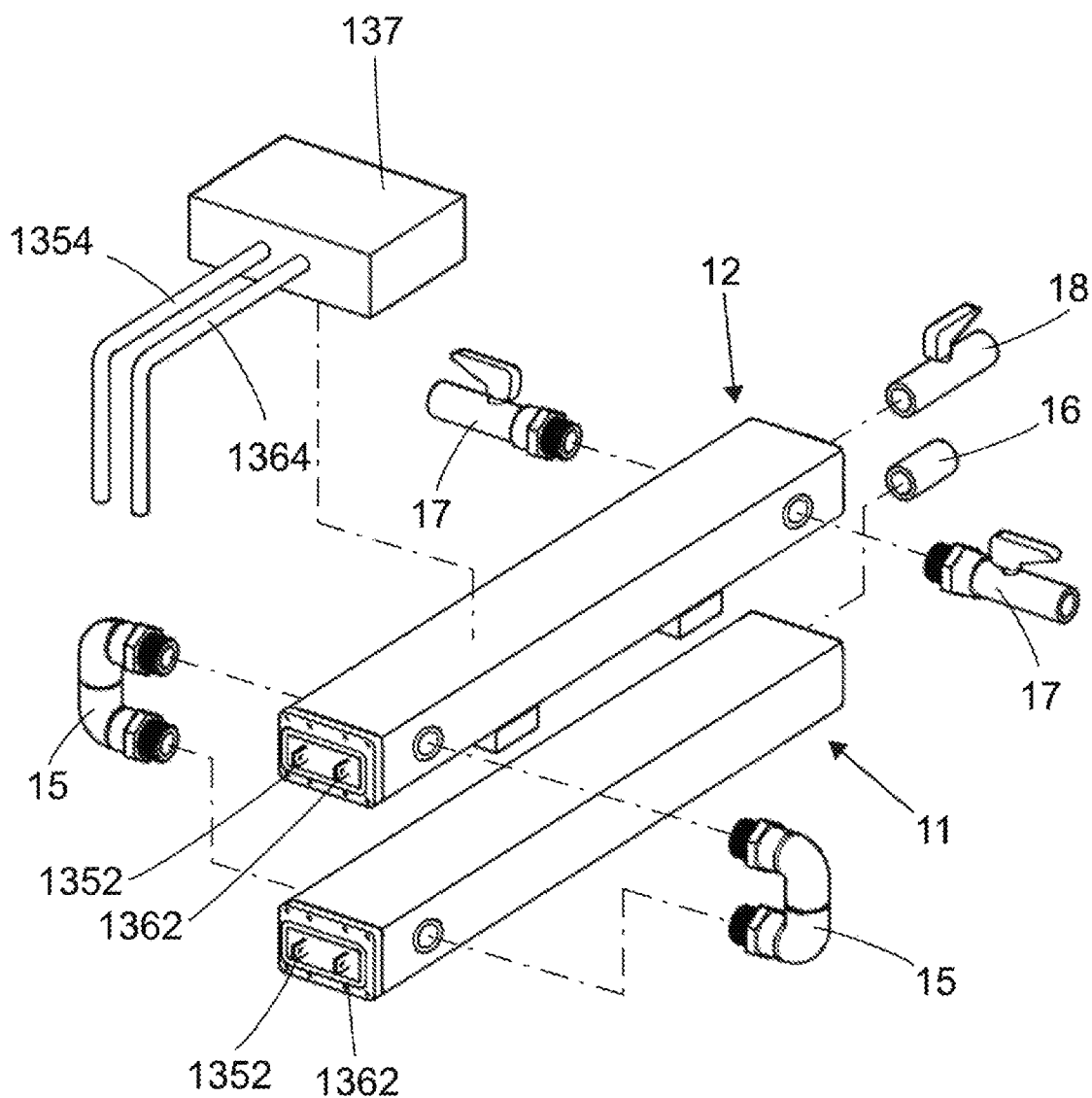
FIG. 2 is an exploded view of the electrocatalytic water device in accordance with a first embodiment of the present invention.
Figure 3:
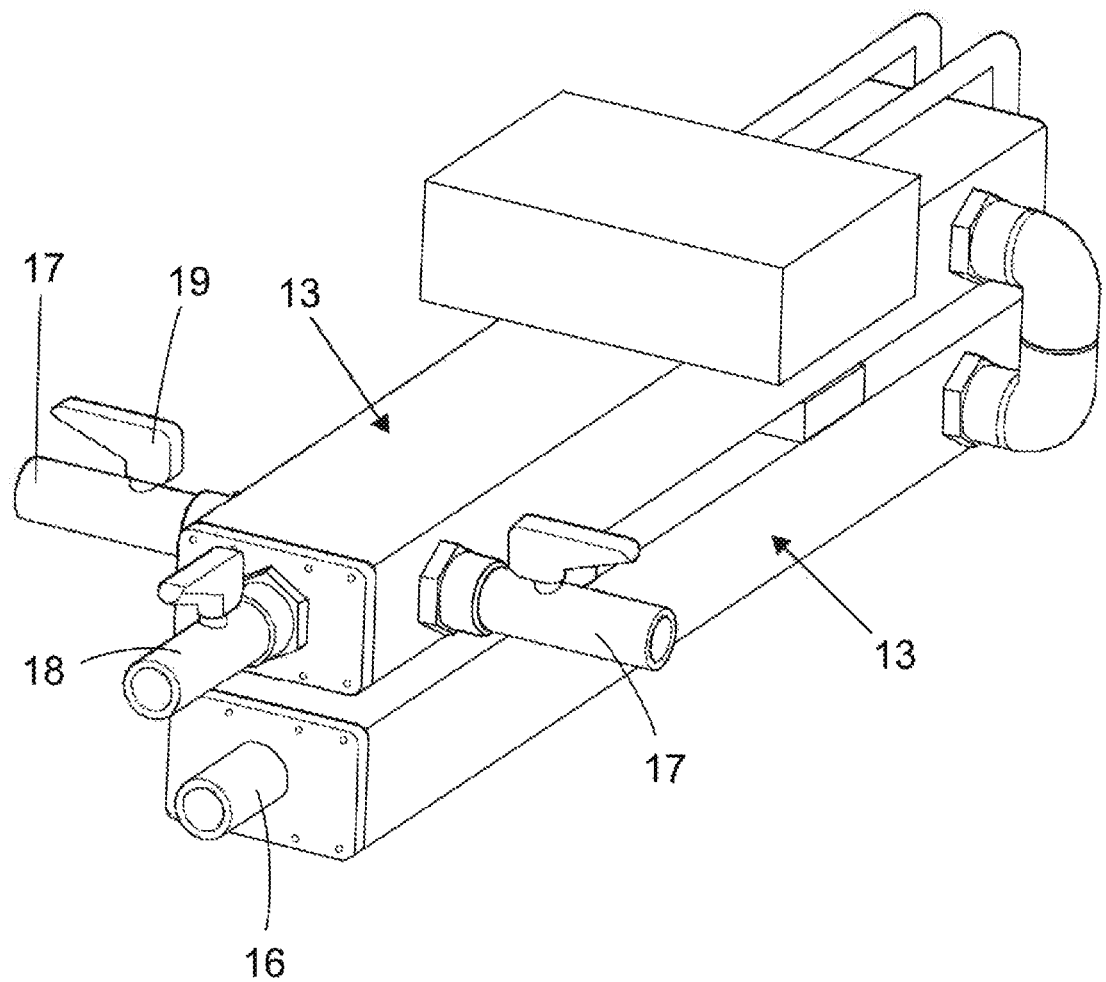
FIG. 3 corresponds to FIG. 1 when viewed from another angle.

FIGS. 1-3 show the structure of the electrocatalytic water device 1 used in Step S0 and Step S1 of the embodiment 1. The electrocatalytic water device 1 comprises a set of N electrocatalytic units 11, 12 stacked in parallel from bottom to top, and the front and rear ends of the electrocatalytic units 11, 12 are sequentially connected by a communicating water pipe 15, wherein N is an integer greater than or equal to 2, and N is an even number. In this embodiment, N is 2.

Figure 4:
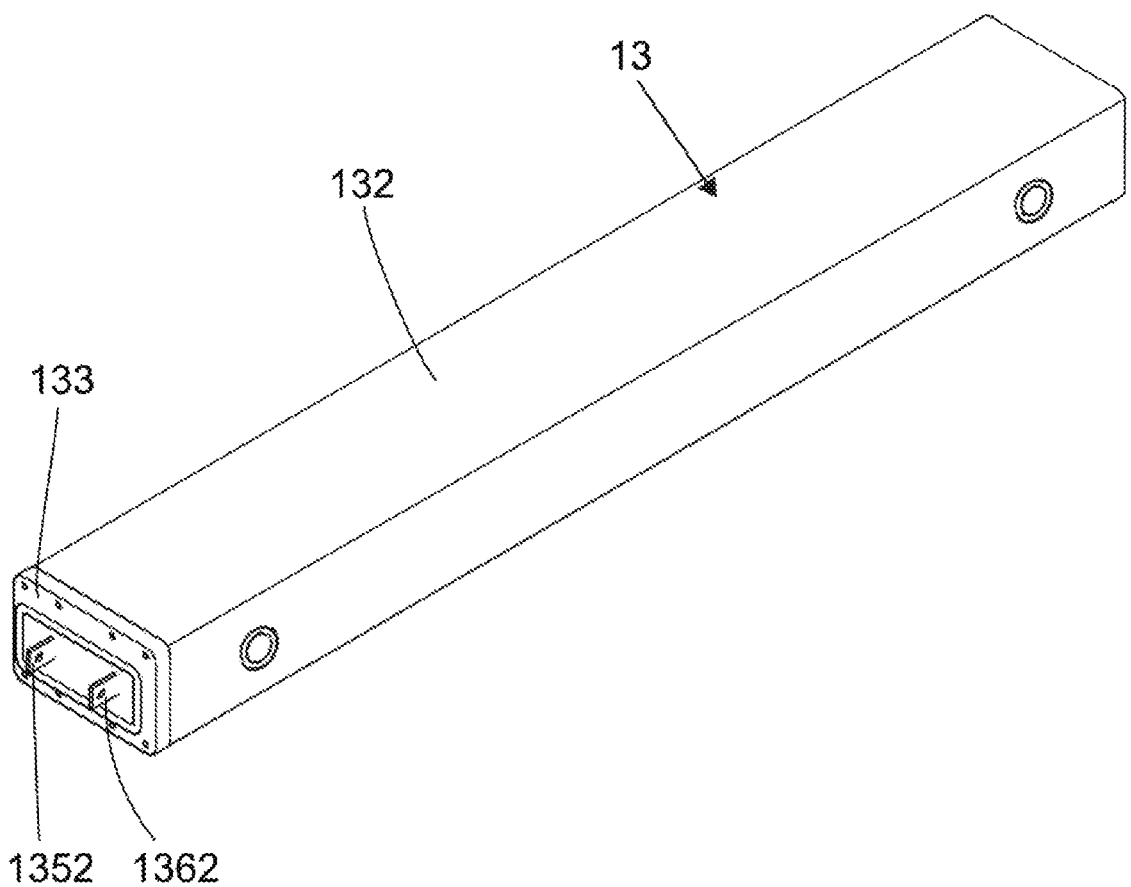
FIG. 4 a schematic perspective view of one electrocatalytic unit of the electrocatalytic water device in accordance with the first embodiment of the present invention.
Figure 5:
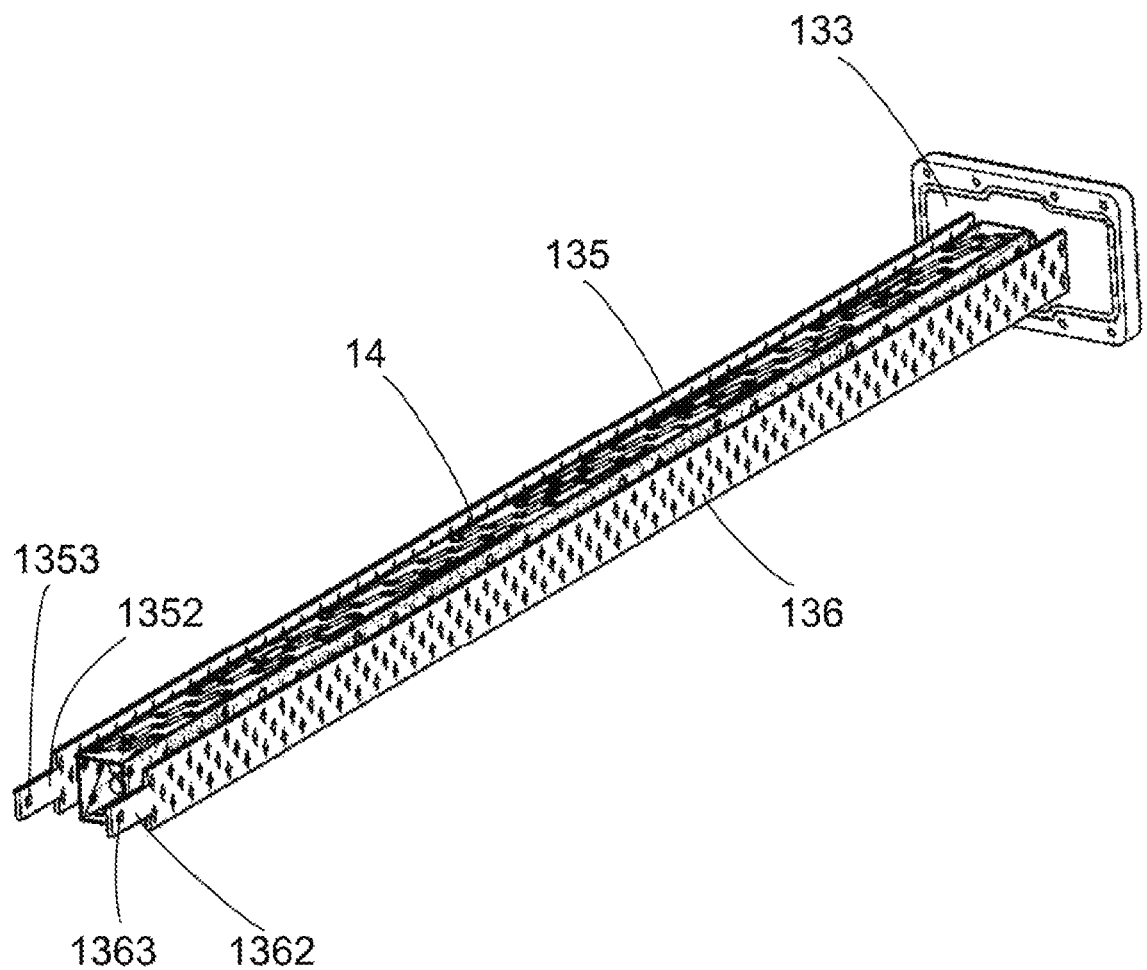
FIG. 5 illustrates the internal structure of the electrocatalytic unit shown in FIG. 4.

As illustrated in FIGS. 4 and 5, each of the electrocatalytic units 11, 12 includes: an electrolytic pipeline 13 and an insulated pipeline 14. A closed cavity 131 is formed in the electrolytic pipeline 13. In the actual use process, the closed cavity 131 of each electrocatalytic unit communicates with each other through the communicating water pipe 15, so that the water coming in from the water inlet 16 can sequentially flow through the respective electrocatalytic units, thereby improving the catalytic efficiency of the water molecules and ensuring the full electrolysis of the water molecules.

Figure 10:
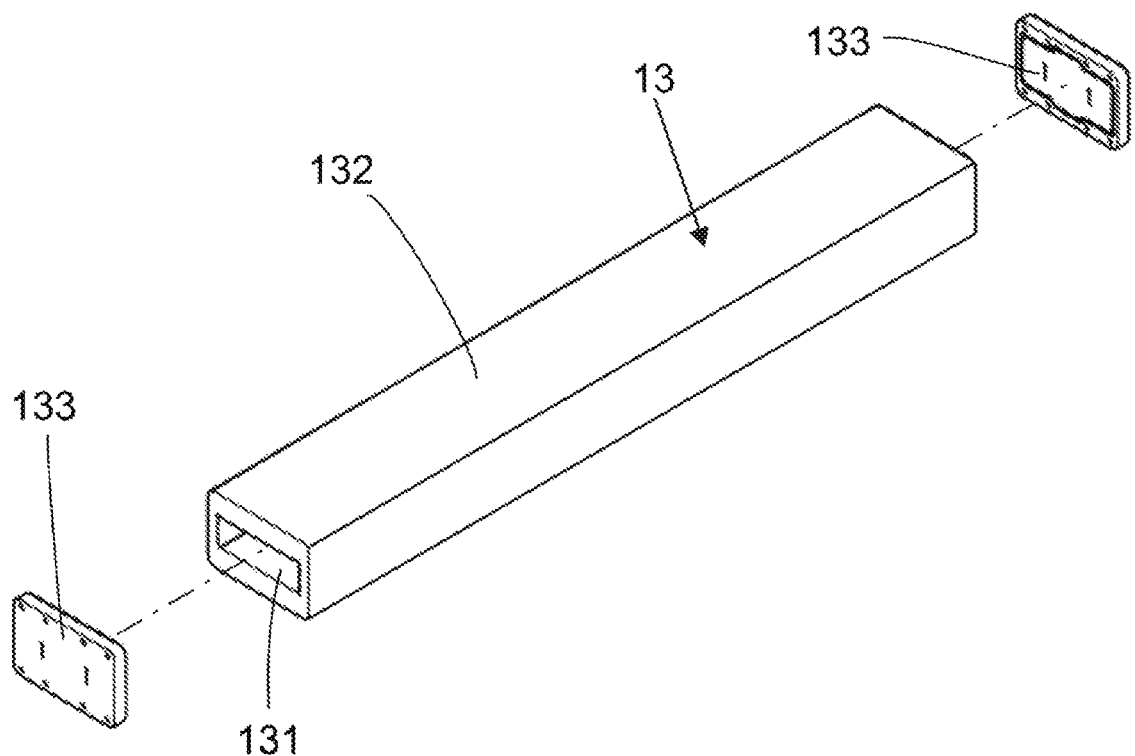
FIG. 10 is an exploded view of the electrolytic pipeline shown in FIG. 4.

As shown in FIG. 10, the electrolytic pipeline 13 includes: a hollow casing 132 with two opposite open ends, and two end caps 133. The two end caps 133 are respectively sealed and connected to the two open ends of the casing 132 by a sealing member (not shown) so that the closed cavity 131 is formed in the casing 132. The sealing member arrangement improves the sealing of the closed cavity 131 and avoids water overflow in the closed cavity 131.

Further, the closed cavity 131 is internally provided with a positive electrode plate 135 and a negative electrode plate 136. The positive electrode plate 135 and the negative electrode plate 136 are respectively disposed opposite to the two sidewalls of the casing 132 of the electrolytic pipeline 13 and are used to apply an electric field within the electrolytic pipeline 13. Further, the positive electrode plate 135 and the negative electrode plate 136 are respectively electrically connected to the positive and negative electrodes of a power source 137.

A first flow path and a second flow path are respectively formed between the positive electrode plate 135 and the inner surface of the sidewall of the electrolytic pipeline 13 opposite to the positive electrode plate 135 and between the negative electrode plate 136 and the inner surface of the sidewall of the electrolytic pipeline 13 opposite to the negative electrode plate 136. The width of the first flow path is equal to the width of the second flow path. The width of the first flow path is equal to the width of the second flow path, so that the strong electric field generated between the positive electrode plate 135 and the negative electrode plate 136 is more uniform, thereby improving the electrolysis efficiency of the water molecules.

Figure 7:
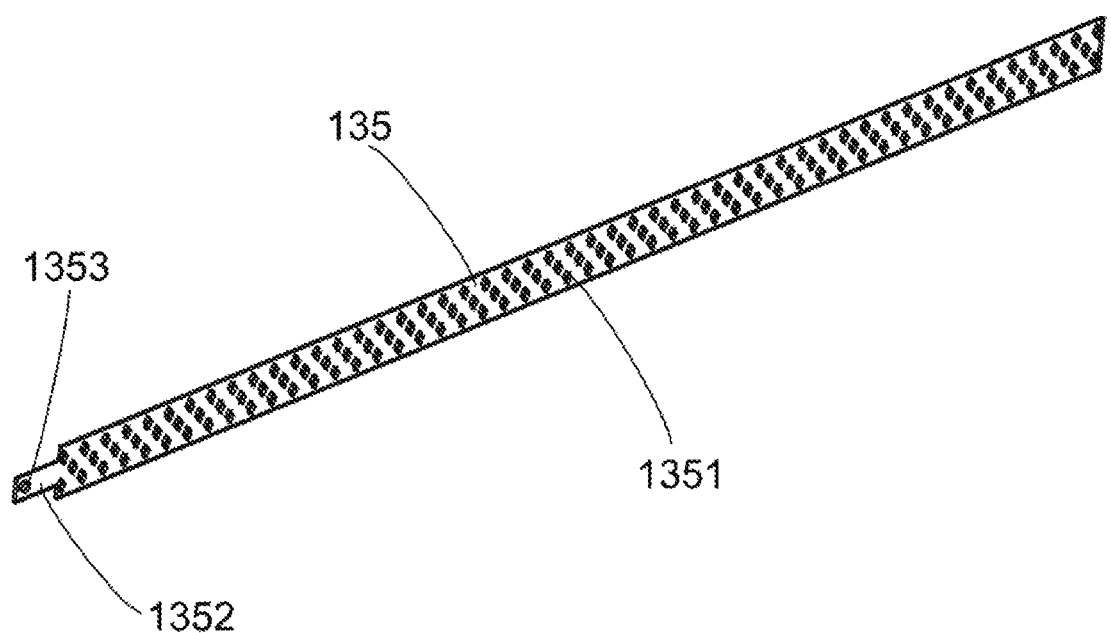
FIG. 7 illustrates the structure of the positive electrode plate shown in FIG. 5.

As shown in FIGS. 5 and 7, the positive electrode plate 135 and the negative electrode plate 136 are respectively provided with a plurality of through holes 1351, 1361. The through holes 1351, 1361 are arranged such that the water molecules between the positive electrode plate 135 and the electrolytic pipeline 13 and the water molecules between the negative electrode plate 136 and the electrolytic pipeline 13 can pass through the positive electrode plate 135, the negative electrode plate 136 to the strong electric field formed between the positive electrode plate 135 and the electrode plates 136. Thereby, the catalysis of the water molecules in the electrolytic pipeline 13 is more sufficient, and the electrolysis effect of the water molecules is further sufficiently improved, so that the electrolysis of the water molecules in the electrolytic pipeline 13 does not have a dead angle.

As shown in FIGS. 5 and 7, the positive electrode plate 135 and the negative electrode plate 136 respectively have an electrode column 1352, 1362 extending outward from the end remote from the water inlet. The two electrode columns 1352, 1362 are respectively provided with a connection hole 1353, 1363. By means of the respective connection holes 1353, 1363, the two electrode columns 1352, 1362 are respectively electrically connected to the positive pole and the negative pole of the power source 137. The power source 137 is placed on the top of the second electrocatalytic unit 12.

In this embodiment, the positive electrode plate 135 and the negative electrode plate 136 are electrically connected to the positive pole and the negative pole of the power source 137 through the respective electrode columns 1352, 1362. Simply by soldering the respective electric wires 1354, 1364 to the connection holes 1353, 1363 of the respective electrode columns 1352, 1362 to realize the electrical connection between the positive and negative electrode plates 135, 136 and the positive and negative poles of the power source 137, the invention reduces the production cost and the electrical connection is more reliable.

In this embodiment, the power source 137 is a high voltage DC power source, and the voltage of the power source 137 is 20V-18000V. Of course, according to actual needs, the power source 137 can be a high voltage AC power source, and the voltage of the power source 137 can be 20V-23000V.

Figure 6:
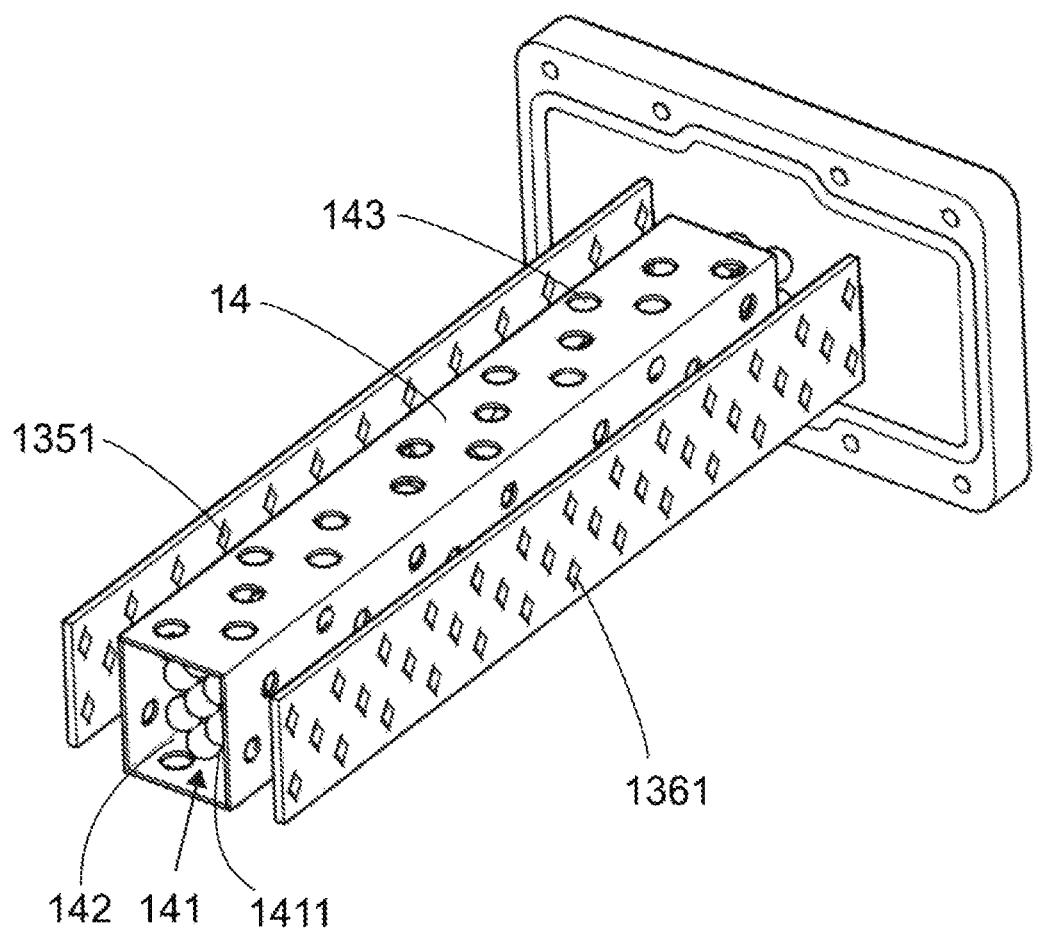
FIG. 6 is a sectional view taken along line A-A of FIG. 5.
Figure 8:
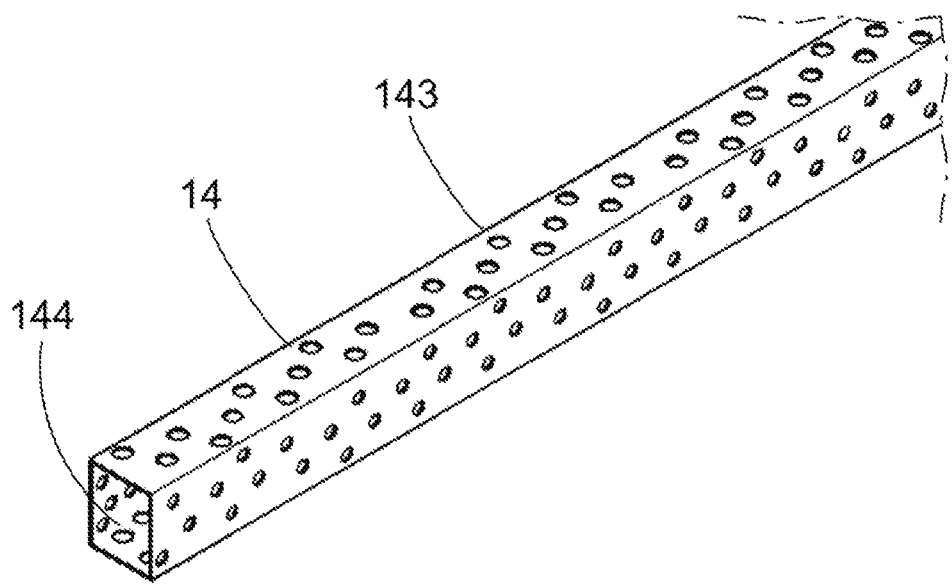
FIG. 8 is a schematic drawing illustrating the structure of the insulated pipeline shown in FIG. 5.

As shown in FIGS. 5 and 6, the insulated pipeline 14 is located between the positive electrode plate 135 and the negative electrode plate 136. The insulated pipeline 14 is provided with a filling layer 141 formed of a low dielectric constant material, and a space 1411 for water circulation is formed in the filling layer 141. A gap 142 communicating with the space 1411 is formed between the filling layer 141 and the sidewall of the insulated pipeline 14, and a sidewall of the insulated pipeline 14 is provided with a plurality of through holes 143 communicating with the gap 142. In this embodiment, as shown in FIG. 8, a cavity 144 is formed in the insulated pipeline 14, and both ends of the insulated pipeline 14 are open, and the cross-sectional shape of the insulated pipeline 14 is rectangular.

The through holes 143 are uniformly spaced apart from the sidewalls of the insulated pipeline 14, and the through holes 143 form a mesh structure. The through holes 143 have a diameter of 5 mm to 6 mm.

The insulated pipeline 14 is located intermediate between the positive electrode plate 135 and the negative electrode plate 136, and the material of the insulated pipeline 14 is an insulating polymer material, which is UPVC (unplasticized polyvinyl chloride), PVC (polyvinyl chloride), PP (polypropylene), or polytetrafluoroethene (PTFE; Teflon). In use, it is possible to keep positive ions generated by discharge or electrolysis moving normally to the anode (i.e., at the position of the positive electrode plate), and the negative ions can be kept moving normally to the cathode (i.e., at the position of the negative electrode plate). Thus, it is possible to keep a large part of the positive ions close to the anode and the negative ions close to the cathode.

Figure 9:
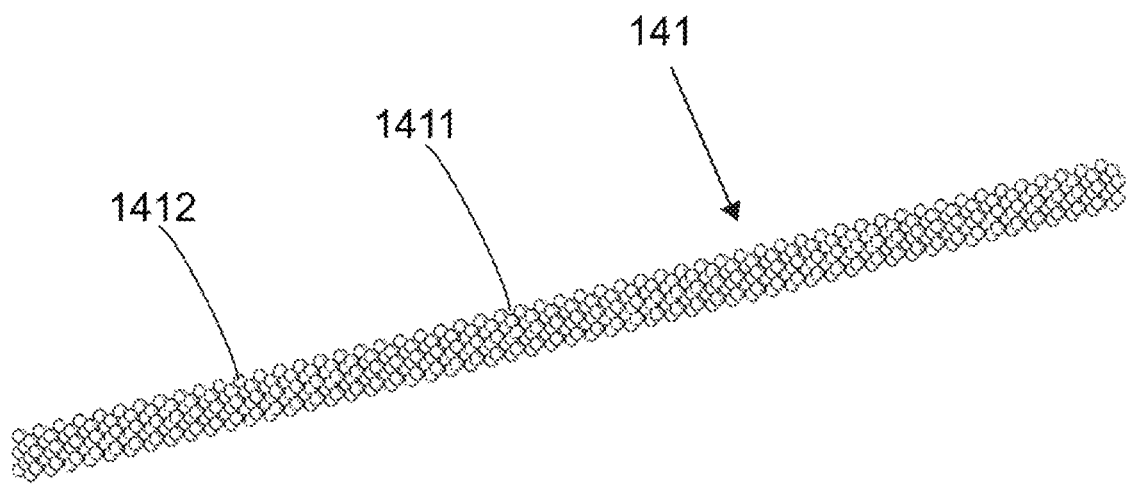
FIG. 9 is a schematic drawing illustrating the structure of the filling layer shown in FIG. 5.

Further, as shown in FIG. 9, the filling layer 141 comprises a plurality of fillers 1412 arranged in sequence, the shape of the fillers 1412 is spherical, cubic or ellipsoidal, and the fillers 1412 are made of a low dielectric constant material. The low dielectric constant material is one or more of glass, alumina, ceramic, corundum porcelain and rutile porcelain. The equivalent diameter of the fillers 1412 is 6 mm-7 mm. In actual use, the diameter of the fillers 1412 matches the diameter of the through holes 143. Generally, the diameter of the fillers 1412 is larger than the diameter of the through holes 143.

In use, the insulated pipeline 14 and the filling layer 141 of the above-mentioned structure are used to make the discharge between the positive electrode plate 135 and the negative electrode plate 136 pass through the low dielectric constant material to achieve uniform discharge. At the same time, instead of using a cation exchange membrane or an anion exchange membrane, a large proportion of positive ions in water can be concentrated on the anode and a large proportion of negative ions can be separated and concentrated in the vicinity of the cathode. It has the function of replacing cation exchange membrane and anion exchange membrane.

Further, the outer surface of each of the fillers 1412 is coated with a catalytic layer. The fillers 1412 are used as carriers, and their surfaces are coated with a catalytic layer. The catalytic layer forms a wet oxidation catalyst in water, and the wet oxidation catalyst is located in the high voltage electric field formed by the positive and negative electrodes and absorbs electric field energy to form a wet electric catalyst. It has the ability to increase oxidation and destroy exhaust gas, making the exhaust gas that was originally difficult to be decomposed and destroyed easy to handle.

Further, the catalytic layer is made of a heterogeneous precious metal catalytic series material. The heterogeneous precious metal catalytic series material is one or more of metal oxides of Ru, Rh, Pt, Ir and Pd. Of course, in actual use, the material of the catalytic layer can be a transition metal oxide catalytic series material, and the transition metal oxide catalytic series material can be one or more of metal oxides of Cu, Mn, Fe and Zn.

As shown in FIGS. 1-3, one end of the electrolytic pipeline 13 in the first electrocatalytic unit 11 is provided with a water inlet 16, and two water outlets 17 are respectively disposed on two opposite side walls of the end of the casing of the electrolytic pipeline 13 in the second electrocatalytic unit 12, and the two water outlets 17 are respectively located close to the positive electrode plate 135 and the negative electrode plate 136. The two water outlets 17 are located at the same end of the electrocatalytic water device 1 as the water inlet 16.

Further, in the second electrocatalytic unit 12, one end of the end cap of the electrolytic pipeline 13 close to the water outlet 17 is provided with another water outlet 18, and the said another water outlet 18 is located between the corresponding two water outlets 17 in the same end of the electrolytic pipeline 13, and the distance between the positive electrode plate 135 and the negative electrode plate 136 is equal to the axis of the said another water outlet 18. In this embodiment, the said another water outlet 18 is also located at the same end of the electrocatalytic water device 1 as the water inlet 16.

Wherein, two water outlets 17 and the said another water outlet 18 are respectively provided with a control valve 19, through which the water output can be adjusted.

In use, the positive electrode plate 135 is electrically connected to the positive pole of the power source 137 through an electric wire 1354, and the negative electrode plate 136 is electrically connected to the negative pole of the power source 137 through a second electric wire 1364. The positive electrode plate 135 and the negative electrode plate 136 are mutually discharged to form a strong electric field. Under the action of the electric field, the metal oxide catalyst attached to the positive electrode plate 135 and the negative electrode plate 136 is induced into a semiconductor in the electric field. The metal oxide catalyst can act as a catalyst to promote the formation of hydrogen ions and hydroxide ions by water molecules and oxygen. At the same time, due to the presence of the low dielectric constant material, the range of discharge is greatly increased, and the electric field formed between the positive electrode plate 135 and the negative electrode plate 136 is more uniform, so that the electrolysis of water molecules is more sufficient, thereby causing the hydrogen ions in the water molecules to move through the insulated pipeline 14 and the filling layer 141 to the positive electrode plate 135 to finally form acidic water in the vicinity of the positive electrode plate 135. Correspondingly, the hydroxide ions move through the insulated pipeline 14 and the filling layer 141 to the negative electrode plate 136, forming alkaline water near the negative electrode plate 136. At the same time, neutral water is formed near the insulated pipeline 14 and the filling layer 141.

The electrocatalytic water device of this embodiment has the following technical effects:

Firstly, a positive electrode plate and a negative electrode plate are disposed in the electrolytic pipeline, so that after the positive electrode plate and the negative electrode plate are energized, a strong electric field is generated between the two electrode plates, so that the metal oxide catalyst attached to the positive electrode plate and the negative electrode plate is induced into a semiconductor in the electric field. The metal oxide catalyst can act as a catalyst to promote the formation of hydrogen ions and hydroxide ions by water molecules and oxygen, thereby increasing the content of hydroxyl radicals in the electrocatalytic water and making the ability to neutralize heavy metal ion charges stronger.

Secondly, an insulated pipeline and a filling layer formed of a low dielectric constant material are disposed between the positive electrode plate and the negative electrode plate to prevent the positive electrode plate and the negative electrode plate from directly discharging the insulated pipeline, allowing the ions between the positive electrode plate and the insulated pipeline and the ions between the negative electrode plate and the insulated pipeline to pass through the insulated pipeline and the filling layer to the corresponding region. Further, because of the existence of the low dielectric constant material, the impedance can be increased, so that the electric field formed between the positive electrode plate and the negative electrode plate is more uniform, thereby improving the uniformity of discharge in water, making electrolysis of water more sufficient, reducing current, saving energy and prolonging the life of the electrode plates by more than 30%.

Thirdly, with the structure of the electrocatalytic water device of the present invention, when the device is operated, the two high voltage electrodes are energized and discharged, and the high voltage current passes through the low dielectric constant material, causing two high voltage electrodes to discharge due to polarization-induced capacitive induced electric fields. Thus, the range of discharge is greatly increased, and the effect of discharge is enhanced, so that the generated electrocatalytic water can be greatly improved in decomposing organic, toxic substances, killing bacteria, neutralizing heavy metal ion charges, etc., and the produced electrocatalytic water has a high content of hydroxyl radicals.

Fourthly, a water outlet is respectively arranged near the positive electrode plate and the negative electrode plate, so that acidic water and alkaline water can be selected according to actual conditions, so that the application of the electrocatalytic water device is wider. Further, a water inlet is arranged in the first electrocatalytic unit, and a water outlet is arranged in the $N^{th}$ electrocatalytic unit, so that the water passes through the N electrocatalytic units, thereby making the electrolysis of the water more sufficient, improving the acidity of acidic water and the alkalinity of alkaline water and improving the ability of electrocatalytic water to decompose organic toxic substances, oil stains and kill bacteria.

Fifthly, the $N^{th}$ electrocatalytic unit is provided with another water outlet at an intermediate position between the positive electrode plate and the negative electrode plate, so that the neutral water can be selected according to the actual situation, and the application of the electrocatalytic water is further expanded.

Example 2

This example provides a method for treating molybdenum ore. The processing method comprises the following Step S1: Mix the tailings with a neutral active aqueous solution uniformly and then dry the tailings, and then repeat the above process 6 times. Wherein the neutral active aqueous solution is prepared from water via an electrocatalytic water device 2, and the circulation time of the water in the electrocatalytic water device 2 is 5 min; the mass ratio of the tailings to the neutral active aqueous solution is 1:1, and the tailings are molybdenum ore.

Figure 11:
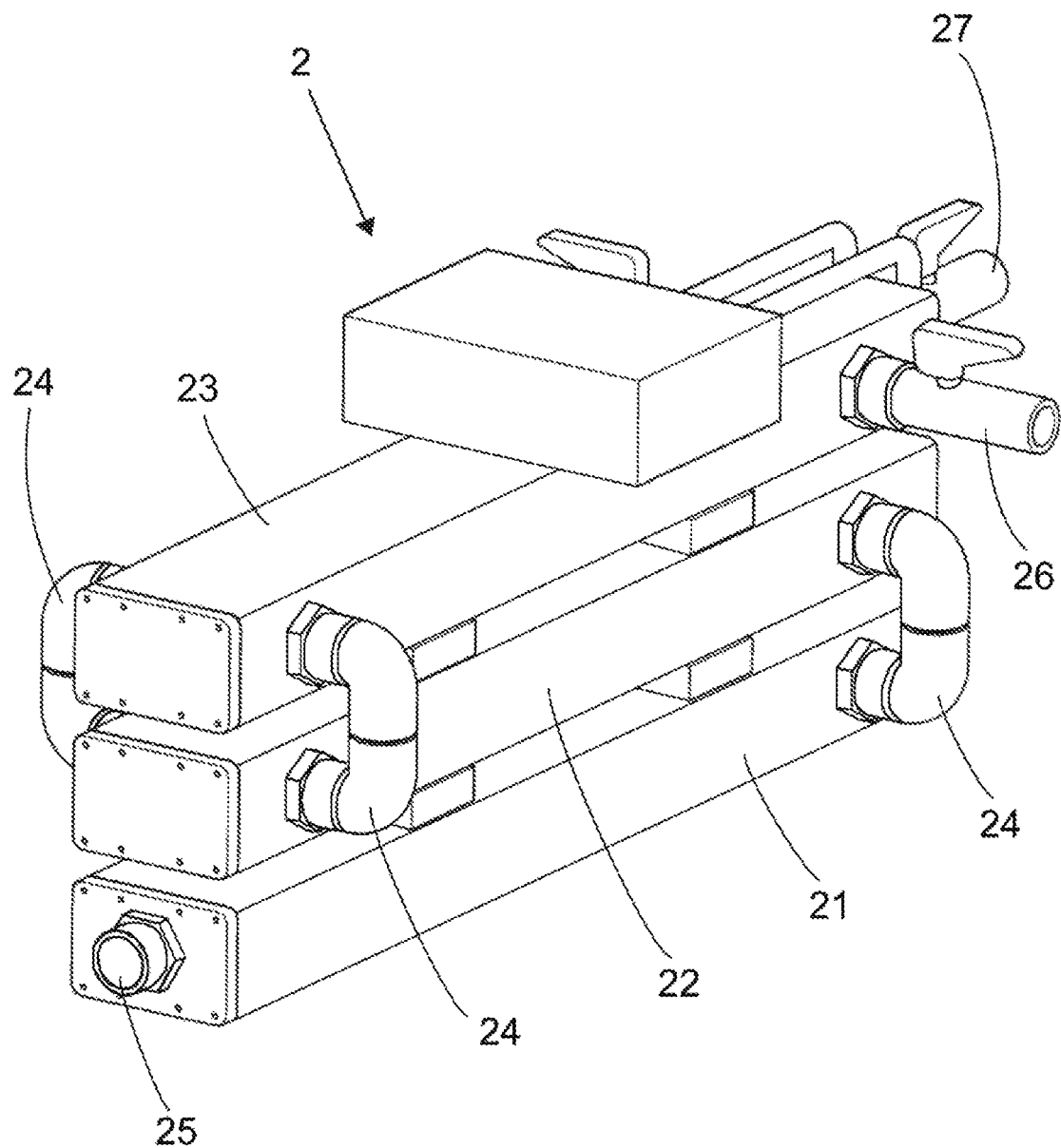
FIG. 11 is a schematic perspective view of an electrocatalytic water device in accordance with a second embodiment of the present invention.
Figure 12:
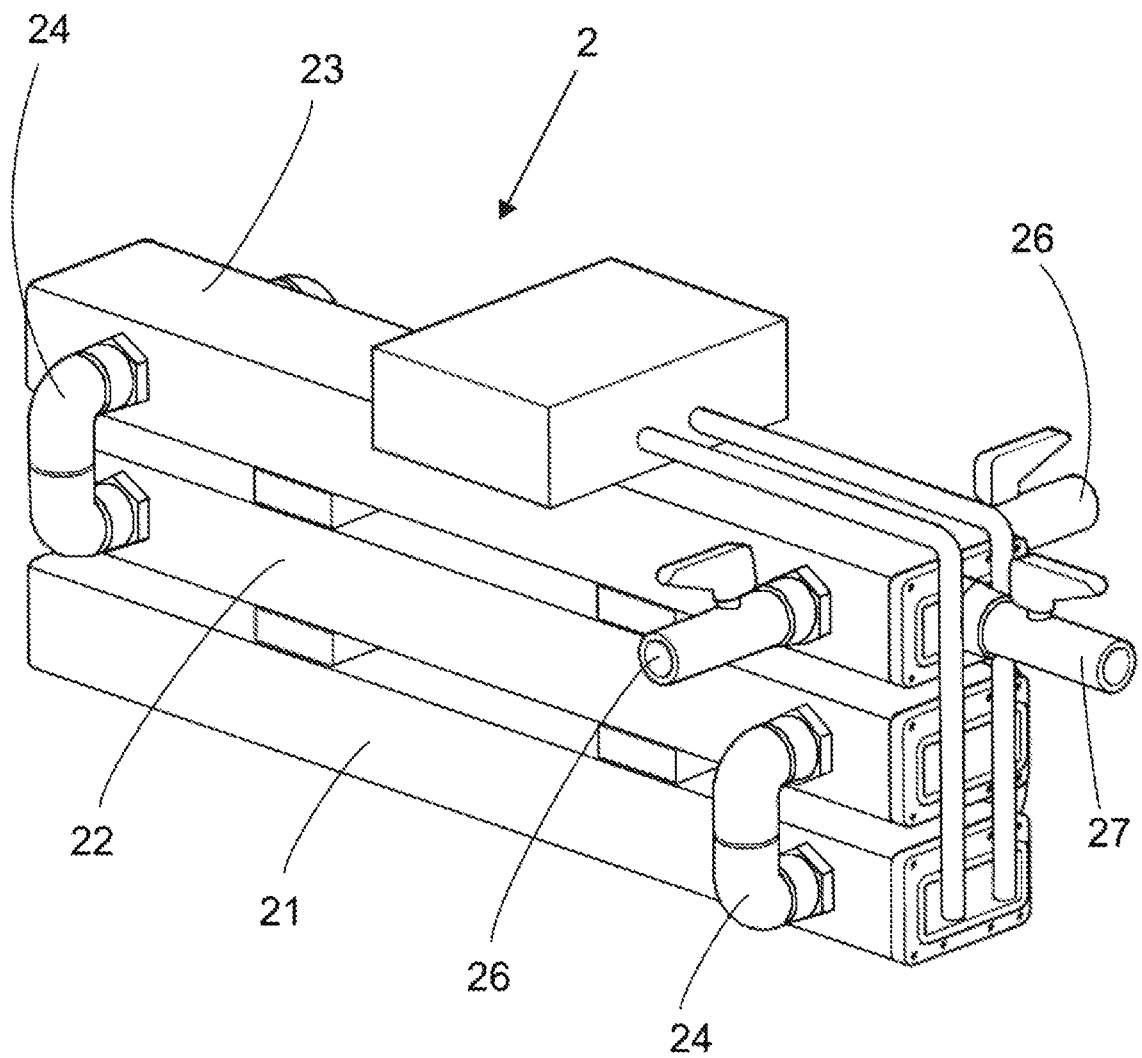
FIG. 12 corresponds to FIG. 11 when viewed from another angle.

The electrocatalytic water device 2 used in Step S1 of this embodiment has many similarities with the structure of the electrocatalytic water device 1 of the aforesaid embodiment 1 and will not be described in detail herein. The electrocatalytic water device 2 of the present embodiment is different from the aforesaid first embodiment outlined hereinafter. As shown in FIGS. 11 and 12, the electrocatalytic water device 2 includes a set of N electrocatalytic units 21, 22, 23 stacked in parallel from bottom to top, and the front and rear ends of the electrocatalytic units 21, 22, 23 are sequentially connected by a communicating water pipe 24. wherein N is greater than or equal to an integer of 2, and N is an odd number. As shown in FIG. 11, N is 3.

Wherein, the water inlet 25 is disposed at one end of the first electrocatalytic unit 21 away from the electrode column 1352, 1362, and the two water outlets 26 and the said another water outlet 27 are disposed in one end of the third electrocatalytic unit 23 near the electrode columns 1352, 1362.

In addition, the two water outlets 26 and the said another water outlet 27 are located at one end of the electrocatalytic water device 2 away from the water inlet 25.

Under the same experimental conditions, the following tests were carried out on the electrolysis efficiency of the water molecules, the decomposition of organic toxic substances, oil stains and the ability of bacteria killing of the electrocatalytic water device of the present invention and the conventional electrocatalytic water device, and the test results are shown in Table 3.

TABLE 3

Comparison between the electrocatalytic water device of the present invention and the conventional electrocatalytic water device

| Parameter | Comparison between the electrocatalytic water device of the invention and the conventional electrocatalytic water device |
|---|---|
| Ability to decompose organic toxic substances and oil stains and to kill bacteria | Improved by more than 50% |
| Life of positive electrode plate and negative electrode plate | Improved by more than 30% |
| Electrolysis efficiency of water molecules | Improved by more than 30% |
| Current energy saving | Improved by more than 30% |
| Hydroxyl radical production | Improved by more than 40% |

Example 3

This example provides a molybdenum ore treatment method. The processing method comprises the following Step S1: Mix the tailings with a neutral active aqueous solution uniformly and then dry the tailings, and then repeat the above process 6 times. Wherein the neutral active aqueous solution is prepared from water via an electrocatalytic water device, and the circulation time of the water in the electrocatalytic water device is 6 min; the mass ratio of the tailings to the neutral active aqueous solution is 10:1, and the tailings are molybdenum ore.

Example 4

The converter stone processing method in this example is substantially similar to the aforesaid first example with the exception as follows:

In Step S0, the reaction time is 0.2 hours, the pH of the active aqueous solution A is 1, and the mass ratio of the converter stone to the active aqueous solution A is 1:0.5.

In Step S1, the circulation time of water in the electrocatalytic water device is 5 min; the mass ratio of the converter stone to the neutral active aqueous solution is 1:1.

Example 5

The converter stone processing method in this example is substantially similar to the aforesaid first example with the exception as follows:

In Step S0, the reaction time is 5 hours, the pH of the active aqueous solution A is 2, and the mass ratio of the converter stone to the active aqueous solution A is 1:10.

In Step S1, the circulation time of water in the electrocatalytic water device is 60 min; the mass ratio of the converter stone to the neutral active aqueous solution is 10:1.

Example 6

A red mud processing method is provided in this example, which substantially similar to the aforesaid first example with the exception as follows:

In Step S0, the reaction time is 0.2 hour, the pH of the active aqueous solution A is 2, and the mass ratio of the red mud to the active aqueous solution A is 1:0.5.

In Step S1, the circulation time of water in the electrocatalytic water device is 5 min; the mass ratio of the red mud to the neutral active aqueous solution is 1:1.

Example 7

A red mud processing method is provided in this example, which substantially similar to the aforesaid first example with the exception as follows:

In Step S0, the reaction time is 5 hours, the pH of the active aqueous solution A is 1, and the mass ratio of the red mud to the active aqueous solution A is 1:10.

In Step S1, the circulation time of water in the electrocatalytic water device is 60 min; the mass ratio of the red mud to the neutral active aqueous solution is 10:1.

Example 8

A method for treating phosphogypsum is provided in this example, which includes the following Step S0': Mix phosphogypsum with an active aqueous solution C, react for 0.1 hour under sealed conditions, and separate the solid and liquid. Wherein the active aqueous solution C has a pH of 12, which is prepared from an aqueous solution of sodium hydroxide via an electrocatalytic water device (the same apparatus as Example 1); the mass ratio of phosphogypsum to the active aqueous solution C is 1:0.5; Step S1 of this example is same as Step S1 of Example 1.

Example 9

A method for treating phosphogypsum is provided in this example, which includes the following Step S0': Mix phosphogypsum with an active aqueous solution C, react for 5 hours under sealed conditions, and separate the solid and liquid. Wherein the active aqueous solution C has a pH of 12, which is prepared from an aqueous solution of sodium hydroxide via an electrocatalytic water device (the same apparatus as Example 1); the mass ratio of phosphogypsum to the active aqueous solution C is 1:10; Step S1 of this example is same as Step S1 of Example 1.

Effects Test 1

The solid phase obtained by solid-liquid separation in Step S1 of Example 1 was subjected to relevant tests according to HJ781-2016, and the test results of the heavy metal content in the obtained solid phase are shown in Table 4 below. In Table 4, the raw material refers to the converter stone before the treatment in Example 1:

We will put the relevant materials mentioned by the inventor in "General Tailings Pollution Control 20180730" into Table 4, please understand.

TABLE 4

Test result of heavy metal content in solid phase obtained by solid-liquid separation in Step S1 of Example 1

| Test item | Raw material | 1 | 2 | 3 | 4 | 5 | 6 | 7 |
|---|---|---|---|---|---|---|---|---|
| Hg (mg/kg) | 53.10 | 35.04 | 20.82 | 13.75 | 7.21 | 4.09 | 2.03 | 1.28 |
| Cu (mg/kg) | 892.6 | 395.2 | 133.7 | 81.6 | 34.20 | 23.71 | 12.05 | 10.26 |
| Zn (mg/kg) | 1039 | 583.0 | 368.4 | 193.7 | 76.82 | 40.24 | 24.82 | 11.11 |
| Pb (mg/kg) | 47.5 | 25.7 | 16.8 | 7.42 | 4.50 | 2.91 | 1.73 | 1.24 |
| Cd (mg/kg) | 905.7 | 533.0 | 215 | 112.7 | 65.47 | 35.02 | 26.84 | 11.21 |
| Be (mg/kg) | 34.79 | 19.54 | 11.83 | 6.05 | 2.43 | 1.67 | 1.15 | 0.42 |
| Ba (mg/kg) | 986.5 | 638.7 | 283.9 | 143.7 | 119.0 | 85.42 | 61.57 | 40.29 |
| Ni (mg/kg) | 1047 | 634.2 | 338.4 | 212.5 | 135.6 | 78.9 | 38.51 | 20.80 |
| As (mg/kg) | 19.85 | 13.23 | 10.29 | 6.68 | 3.91 | 1.83 | 1.08 | 0.84 |
| Cr (mg/kg) | 1183 | 760.8 | 382.9 | 182.6 | 152.7 | 84.5 | 63.12 | 37.83 |
| $Cr^{+6}$ (mg/kg) | 863.9 | 482.1 | 276.4 | 136.2 | 68.70 | 43.69 | 25.11 | 13.47 |
| Hg (mg/kg) | 43.4 | 25.72 | 18.25 | 10.51 | 7.06 | 4.88 | 3.32 | 2.05 |

Effects Test 1

It can be seen from Table 4 that the heavy metal content in the raw material can be greatly reduced by the treatment method of the present invention.

It is calculated that Step S0 of the first example of the present invention processes 1 $m^3$ converter stone requires 1.2 t of electrocatalytic water; 0.3% hydrochloric acid (pH about 1.5) is added with water to pH 6.5, that is, the amount of hydrochloric acid required is 5.32 Kg. It is calculated that Step S1 of the example 1 of the present invention processes 1 $m^3$ converter stone requires 3.5 t of electrocatalytic water.

The power of the 1 t electrocatalytic water device used in Example 1 was 7.7 kW, the execution time was 90 min, and the total required electricity was 34.52 kW·h.

In summary, the treatment method of the present invention can use a small amount of hydrochloric acid solution, with a small amount of water and electricity, to control the alkali and heavy metal pollution of the converter stone.

Effects Tests 2-9 (Because the inventor failed to provide specific experimental data for the effects of Examples 2-9, we use the following qualitative expressions, please be aware)

The solid phase obtained by solid-liquid separation in Step S1 of Examples 2-9 was subjected to relevant tests according to HJ781-2016, and the test results showed that: The treatment method of the invention can greatly reduce the heavy metal content in molybdenum ore, red mud and phosphogypsum.

It is calculated that the treatment method of the present invention can control the heavy metal pollution of molybdenum ore with a small amount of water and electricity.

It is calculated that the treatment method of the present invention can use a small amount of hydrochloric acid solution, with a small amount of water and electricity, to control the alkaline and heavy metal pollution of the red mud.

It is calculated that the treatment method of the present invention can treat the acidity and heavy metal pollution of phosphogypsum with a small amount of sodium hydroxide solution and a small amount of water and electricity.

Comparative Example 1

The solid phase I obtained by solid-liquid separation in Example 1 of the Chinese utility model patent CN201610527392.6 was tested according to HJ781-2016, and the test results of the heavy metal content in the solid phase I obtained are shown in Table 5 below (the data in Table 5 is provided by the inventor, please know). In Table 5, the raw material refers to the converter stone before the treatment in Example 1 of the Chinese utility model patent CN201610527392.6:

TABLE 5

Test result of heavy metal content in solid phase I

| Test item | Raw material | Heavy metal content in solid phase I |
|---|---|---|
| Hg (mg/kg) | 53.10 | 65.2 |
| Cu (mg/kg) | 892.6 | 1103.2 |
| Zn (mg/kg) | 1039 | 1231 |
| Pb (mg/kg) | 47.5 | 63.1 |
| Cd (mg/kg) | 905.7 | 1100.5 |
| Be (mg/kg) | 34.79 | 45.4 |
| Ba (mg/kg) | 986.5 | 1005.2 |
| Ni (mg/kg) | 1047 | 1120 |
| As (mg/kg) | 19.85 | 30.1 |
| Cr (mg/kg) | 1183 | 1302.1 |
| $C^{r+6}$ (mg/kg) | 863.9 | 980.5 |
| Hg (mg/kg) | 43.4 | 52.3 |

It can be seen from Table 5 that the first example of the Chinese utility model patent CN201610527392.6 is only treated by the acidic active aqueous solution, and the heavy metal content cannot be reduced, and the heavy metal content has a higher tendency than the raw material.

What the invention claimed is:

1. A method for treating tailings, comprising the step of S1: mixing the tailings to be treated with a neutral active aqueous solution and then drying said tailings repeatedly at least 2 times, said tailings being molybdenum ore, wherein said neutral active aqueous solution is prepared by passing water through an electrocatalytic water device with a circulation time of the water in said electrocatalytic water device within a range of 5-40 min, and wherein a mass ratio of said tailings to said neutral active aqueous solution is 3:1-5:1.

2. The method for treating tailings as claimed in claim 1, wherein the circulation time of the water in said electrocatalytic water device is within the range of 10-20 min; and the number of repeated cycles of mixing said tailings with said neutral active aqueous solution and then drying said tailings is in the range of 2-10 times.

3. The method for treating tailings as claimed in claim 2, wherein said electrocatalytic water device comprises a set of N electrocatalytic units stacked in parallel from bottom to top, and opposing front and rear ends of said electrocatalytic units being sequentially connected by a communicating water pipe, wherein N is an integer greater than or equal to 2, each said electrocatalytic units comprising an electrolytic pipeline and an insulated pipeline, said electrolytic pipeline comprising a closed cavity defined therein and a positive electrode plate and a negative electrode plate provided in said closed cavity, said positive electrode plate and said negative electrode plate being respectively disposed opposite to two sidewalls of said electrolytic pipeline and are used to apply an electric field within said electrolytic pipeline, said positive electrode plate and said negative electrode plate being respectively electrically connected to the positive and negative electrodes of a power source, said insulated pipeline being located between said positive electrode plate and said negative electrode plate and provided with a filling layer formed of a low dielectric constant material, a space for water circulation being formed in said filling layer, a gap communicating with said space being formed between said filling layer and a sidewall of said insulated pipeline, and said sidewall of said insulated pipeline being provided with a plurality of through holes communicating with said gap, wherein one end of said electrolytic pipeline in the first said electrocatalytic unit is provided with a water inlet, and two water outlets are respectively disposed on two opposite side walls of the end of said electrolytic pipeline in the $N^{th}$ said electrocatalytic unit, and the two said water outlets are respectively located close to said positive electrode plate and said negative electrode plate.

4. The method for treating tailings as claimed in claim 1, wherein Step S1 is preceded by the step of mixing said tailings with an active aqueous solution A, reacting under sealed conditions for 0.2-5 hours, and subsequently performing the reaction in Step S1 after solid-liquid separation is performed before said tailings are uniformly mixed with said neutral active aqueous solution, wherein said active aqueous solution A has a pH of 1-2, which is prepared by passing an aqueous hydrochloric acid solution through the electrocatalytic water device, and wherein the mass ratio of said tailings to said active aqueous solution A is 1: (0.5-10); wherein the concentration of said aqueous hydrochloric acid solution is in the range of 0.1 wt % to 5 wt %; wherein the pH of said aqueous hydrochloric acid solution is 4-7; and wherein a circulation time of said aqueous hydrochloric acid solution in said electrocatalytic water device is in the range of 3 to 30 min; preceding Step S1, the pH of the solid phase obtained by the solid-liquid separation is in the range of 6 to 9, and the pH of the obtained liquid phase is in the range of 5 to 7, wherein the liquid phase is allowed to stand and discharged.

5. The method for treating tailings as claimed in claim 4, wherein said electrocatalytic water device comprises a set of N electrocatalytic units stacked in parallel from bottom to top, and opposing front and rear ends of said electrocatalytic units being sequentially connected by a communicating water pipe, wherein N is an integer greater than or equal to 2, each said electrocatalytic units comprising an electrolytic pipeline and an insulated pipeline, said electrolytic pipeline comprising a closed cavity defined therein and a positive electrode plate and a negative electrode plate provided in said closed cavity, said positive electrode plate and said negative electrode plate being respectively disposed opposite to two sidewalls of said electrolytic pipeline and are used to apply an electric field within said electrolytic pipeline, said positive electrode plate and said negative electrode plate being respectively electrically connected to the positive and negative electrodes of a power source, said insulated pipeline being located between said positive electrode plate and said negative electrode plate and provided with a filling layer formed of a low dielectric constant material, a space for water circulation being formed in said filling layer, a gap communicating with said space being formed between said filling layer and a sidewall of said insulated pipeline, and said sidewall of said insulated pipeline being provided with a plurality of through holes communicating with said gap, wherein one end of said electrolytic pipeline in the first said electrocatalytic unit is provided with a water inlet, and two water outlets are respectively disposed on two opposite side walls of the end of said electrolytic pipeline in the $N^{th}$ said electrocatalytic unit, and the two said water outlets are respectively located close to said positive electrode plate and said negative electrode plate.

6. The method for treating tailings as claimed in claim 4, wherein said tailings include a converter stone, wherein preceding Step S1, the mass ratio of said converter stone and said active aqueous solution A is 1: (2-5) and the pH of said active aqueous solution A is 1.5; the pH of said aqueous hydrochloric acid solution is 6.5; the circulation time of said aqueous hydrochloric acid solution in said electrocatalytic water device is 20 min; the pH of the solid phase obtained by the solid-liquid separation is in the range of 7 to 8.

7. The method for treating tailings as claimed in claim 6, wherein the mass ratio of said converter stone and said active aqueous solution A is 1:5 and the concentration of said aqueous hydrochloric acid solution is 0.3 wt %.

8. The method for treating tailings as claimed in claim 1, wherein said electrocatalytic water device comprises a set of N electrocatalytic units stacked in parallel from bottom to top, and opposing front and rear ends of said electrocatalytic units being sequentially connected by a communicating water pipe, wherein N is an integer greater than or equal to 2, each said electrocatalytic units comprising an electrolytic pipeline and an insulated pipeline, said electrolytic pipeline comprising a closed cavity defined therein and a positive electrode plate and a negative electrode plate provided in said closed cavity, said positive electrode plate and said negative electrode plate being respectively disposed opposite to two sidewalls of said electrolytic pipeline and are used to apply an electric field within said electrolytic pipeline, said positive electrode plate and said negative electrode plate being respectively electrically connected to the positive and negative electrodes of a power source, said insulated pipeline being located between said positive electrode plate and said negative electrode plate and provided with a filling layer formed of a low dielectric constant material, a space for water circulation being formed in said filling layer, a gap communicating with said space being formed between said filling layer and a sidewall of said insulated pipeline, and said sidewall of said insulated pipeline being provided with a plurality of through holes communicating with said gap, wherein one end of said electrolytic pipeline in the first said electrocatalytic unit is provided with a water inlet, and two water outlets are respectively disposed on two opposite side walls of the end of said electrolytic pipeline in the $N^{th}$ said electrocatalytic unit, and the two said water outlets are respectively located close to said positive electrode plate and said negative electrode plate.

9. The method for treating tailings as claimed in claim 8, wherein one end of said electrolytic pipeline of the $N^{th}$ said electrocatalytic unit is provided with another water outlet, and the said another water outlet is located between the corresponding two said water outlets in the same end of said electrolytic pipeline, and the distance between said positive electrode plate and said negative electrode plate is equal to the axis of the said another water outlet; a first flow path and a second flow path are respectively formed between said positive electrode plate and an inner surface of a sidewall of said electrolytic pipeline opposite to said positive electrode plate and between said negative electrode plate and an inner surface of a sidewall of said electrolytic pipeline opposite to said negative electrode plate, and the width of said first flow path is equal to the width of said second flow path; said positive electrode plate and said negative electrode plate are respectively provided with a plurality of through holes.

10. The method for treating tailings as claimed in claim 9, wherein said positive electrode plate and negative electrode plate respectively have an electrode column extending outward from the end remote from said water inlet, said two electrode columns being respectively provided with a connection hole, said two electrode columns being respectively electrically connected to the positive pole and the negative pole of said power source by means of the respective said connection holes; said power source is selectively a high voltage DC power source with the voltage of 20V-18000V; or a high voltage AC power source with the voltage of 20V-23000V.

11. The method for treating tailings as claimed in claim 10, wherein said electrolytic pipeline comprises a hollow casing with two opposite open ends, and two end caps respectively sealed and connected to the two open ends of said casing by a sealing member so that said closed cavity is formed in said casing.

12. The method for treating tailings as claimed in claim 8, wherein said through holes are uniformly spaced apart from sidewalls of said insulated pipeline to form a mesh structure; said insulated pipeline is located intermediate between said positive electrode plate and said negative electrode plate, and the material of said insulated pipeline is an insulating polymer material, which is UPVC (unplasticized polyvinyl chloride), PVC (polyvinyl chloride), PP (polypropylene), or polytetrafluoroethene (PTFE; Teflon); said filling layer comprises a plurality of fillers arranged in sequence, the shape of said fillers being selectively spherical, cubic or ellipsoidal, said fillers being made of a low dielectric constant material, which is one or more of glass, alumina, ceramic, corundum porcelain and rutile porcelain, the equivalent diameter of said fillers being 6 mm-7 mm.

13. The method for treating tailings as claimed in claim 12, wherein said fillers are respectively peripherally coated with a catalytic layer, said catalytic layer being selectively made of a heterogeneous precious metal catalytic series material, which is one or more of metal oxides of Ru, Rh, Pt, Ir and Pd, or a transition metal oxide catalytic series material, which is one or more of metal oxides of Cu, Mn, Fe and Zn.

14. The method for treating tailings as claimed in claim 1, wherein the number of repeated cycles of mixing said tailings with said neutral active aqueous solution and then drying said tailings is in the range of 2-10 times.

15. The method for treating tailings as claimed in claim 14, wherein the number of repeated cycles of mixing said tailings with said neutral active aqueous solution and then drying said tailings is 7 times.

16. A method for treating tailings, comprising the step of S1: mixing the tailings to be treated with a neutral active aqueous solution, and subsequently drying said tailings repeatedly at least 2 times, said tailings being converter stone or red mud, wherein said neutral active aqueous solution is prepared by passing water through an electrocatalytic water device with a circulation time of the water in said electrocatalytic water device within a range of 5-60 min, and wherein a mass ratio of said tailings to said neutral active aqueous solution is 1:1-10:1; and wherein Step S1 is preceded by the step of mixing said tailings with an active aqueous solution A, reacting under sealed conditions for 0.2-5 hours, and subsequently performing the reaction in Step S1 after solid-liquid separation is performed before said tailings are uniformly mixed with said neutral active aqueous solution, wherein said active aqueous solution A has a pH of 1-2, which is prepared by passing an aqueous hydrochloric acid solution through the electrocatalytic water device, wherein the mass ratio of said tailings to said active aqueous solution A is 1: (0.5-10); wherein the concentration of said aqueous hydrochloric acid solution is in the range of 0.1 wt % to 5 wt %, the pH of said aqueous hydrochloric acid solution is 4-7; and wherein a circulation time of said aqueous hydrochloric acid solution in said electrocatalytic water device is in the range of 3 to 30 min; preceding Step S1, the pH of the solid phase obtained by the solid-liquid separation is in the range of 6 to 9, and the pH of the obtained liquid phase is in the range of 5 to 7, wherein the liquid phase is allowed to stand and discharged.

17. A method for treating tailings, comprising the step of S1: mixing the tailings to be treated with a neutral active aqueous solution and then drying said tailings repeatedly at least 2 times, said tailings being phosphogypsum, wherein said neutral active aqueous solution is prepared by passing water through an electrocatalytic water device with a circulation time of the water in said electrocatalytic water device within a range of 5-60 min, and wherein a mass ratio of said tailings to said neutral active aqueous solution is 1:1-10:1; and wherein Step S1 is preceded by the step of uniformly mixing said tailings with a neutral active aqueous solution C, reacting under sealed conditions for 0.1-5 hours and subsequently performing solid-liquid separation, wherein said active aqueous solution C has a pH of 12, which is prepared by passing an aqueous solution of sodium hydroxide through the electrocatalytic water device, and wherein the mass ratio of said tailings to said active aqueous solution C is 1: (0.5-10).

18. The method for treating tailings as claimed in claim 17, wherein said electrocatalytic water device comprises a set of N electrocatalytic units stacked in parallel from bottom to top, and opposing front and rear ends of said electrocatalytic units being sequentially connected by a communicating water pipe, wherein N is an integer greater than or equal to 2, each said electrocatalytic units comprising an electrolytic pipeline and an insulated pipeline, said electrolytic pipeline comprising a closed cavity defined therein and a positive electrode plate and a negative electrode plate provided in said closed cavity, said positive electrode plate and said negative electrode plate being respectively disposed opposite to two sidewalls of said electrolytic pipeline and are used to apply an electric field within said electrolytic pipeline, said positive electrode plate and said negative electrode plate being respectively electrically connected to the positive and negative electrodes of a power source, said insulated pipeline being located between said positive electrode plate and said negative electrode plate and provided with a filling layer formed of a low dielectric constant material, a space for water circulation being formed in said filling layer, a gap communicating with said space being formed between said filling layer and a sidewall of said insulated pipeline, and said sidewall of said insulated pipeline being provided with a plurality of through holes communicating with said gap, wherein one end of said electrolytic pipeline in the first said electrocatalytic unit is provided with a water inlet, and two water outlets are respectively disposed on two opposite side walls of the end of said electrolytic pipeline in the $N^{th}$ said electrocatalytic unit, and the two said water outlets are respectively located close to said positive electrode plate and said negative electrode plate.

* * * * *